(12) United States Patent
Wu et al.

(10) Patent No.: US 10,896,080 B2
(45) Date of Patent: Jan. 19, 2021

(54) S.M.A.R.T. THRESHOLD OPTIMIZATION METHOD USED FOR DISK FAILURE DETECTION

(71) Applicant: Huazhong University of Science and Technology, Hubei (CN)

(72) Inventors: Song Wu, Hubei (CN); Zhuang Xiong, Hubei (CN); Hai Jin, Hubei (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 280 days.

(21) Appl. No.: 16/135,480

(22) Filed: Sep. 19, 2018

(65) Prior Publication Data
US 2019/0205193 A1 Jul. 4, 2019

(51) Int. Cl.
*G06F 11/00* (2006.01)
*G06F 11/22* (2006.01)
(Continued)

(52) U.S. Cl.
CPC .......... *G06F 11/008* (2013.01); *G06F 11/079* (2013.01); *G06F 11/0727* (2013.01);
(Continued)

(58) Field of Classification Search
CPC ............. G06F 11/0793; G06F 11/0757; G06F 11/079; G06F 11/3452; G06F 11/008;
(Continued)

(56) References Cited

U.S. PATENT DOCUMENTS 5,090,014 A * 2/1992 Polich ................. G06F 11/2257
706/916
5,422,890 A * 6/1995 Klingsporn ........... G06F 11/008
714/704

(Continued)

OTHER PUBLICATIONS

Zhu, "Proactive Drive Failure Prediction for Large Scale Storage Systems", Apr. 13, 2013, IEEE, pp. 1-5 (Year: 2013).*

(Continued)

*Primary Examiner* — Bryce P Bonzo
*Assistant Examiner* — Jeison C Arcos
(74) *Attorney, Agent, or Firm* — Michael X. Ye; Morris, Manning & Martin, LLC

(57) ABSTRACT

An S.M.A.R.T. threshold optimization method used for disk failure detection includes the steps of: analyzing S.M.A.R.T. attributes based on correlation between S.M.A.R.T. attribute information about plural failed and non-failed disks and failure information and sieving out weakly correlated attributes and/or strongly correlated attributes; and setting threshold intervals, multivariate thresholds and/or native thresholds corresponding to the S.M.A.R.T. attributes based on distribution patterns of the strongly or weakly correlated attributes. As compared to reactive fault tolerance, the disclosed method has no negative effects on reading and writing performance of disks and performance of storage systems as a whole. As compared to the known methods that use native disk S.M.A.R.T. thresholds, the disclosed method significantly improves disk failure detection rate with a low false alarm rate. As compared to disk failure forecast based on machine learning algorithm, the disclosed method has good interpretability and allows easy adjustment of its forecast performance.

7 Claims, 6 Drawing Sheets

(51) Int. Cl.
*G06F 11/30* (2006.01)
*G06K 9/62* (2006.01)
*G06F 11/34* (2006.01)
*G06N 20/00* (2019.01)
*G06F 11/07* (2006.01)

(52) U.S. Cl.
CPC ...... *G06F 11/0766* (2013.01); *G06F 11/2221* (2013.01); *G06F 11/2268* (2013.01); *G06F 11/2273* (2013.01); *G06F 11/3034* (2013.01); *G06F 11/3442* (2013.01); *G06F 11/3485* (2013.01); *G06K 9/6269* (2013.01); *G06N 20/00* (2019.01); *G06F 2201/81* (2013.01)

(58) Field of Classification Search
CPC ..... G06F 3/0634; G06F 3/0653; G05N 20/20; G05N 20/025
See application file for complete search history.

(56) References Cited

U.S. PATENT DOCUMENTS

| | | | | |
|---|---|---|---|---|
| 5,761,411 | A * | 6/1998 | Teague | G06F 11/004 714/42 |
| 6,058,494 | A * | 5/2000 | Gold | G06F 11/073 714/42 |
| 6,467,054 | B1 * | 10/2002 | Lenny | G06F 11/004 369/53.17 |
| 7,136,768 | B1 * | 11/2006 | Shah | G06F 11/008 702/115 |
| 7,215,619 | B1 * | 5/2007 | Van Den Enden | G11B 7/00375 369/53.15 |
| 8,655,908 | B2 * | 2/2014 | Kenedy | G06F 16/2282 707/769 |
| 9,542,296 | B1 | 1/2017 | Engers | G06F 11/2033 |
| 10,216,558 | B1 * | 2/2019 | Gaber | G06F 11/3447 |
| 2002/0036850 | A1 * | 3/2002 | Lenny | G11B 20/1879 360/31 |
| 2002/0060868 | A1 * | 5/2002 | Lenny | G11B 19/04 360/31 |
| 2004/0125493 | A1 * | 7/2004 | Shimotono | G11B 19/04 360/75 |
| 2004/0260967 | A1 * | 12/2004 | Guha | G06F 11/1084 714/3 |
| 2005/0010843 | A1 * | 1/2005 | Iwamitsu | G06F 11/201 714/724 |
| 2005/0060618 | A1 * | 3/2005 | Guha | G06F 11/008 714/54 |
| 2005/0096866 | A1 * | 5/2005 | Shan | G06F 11/0751 702/179 |
| 2005/0102567 | A1 * | 5/2005 | McGuire | G06F 11/2257 714/25 |
| 2006/0025965 | A1 * | 2/2006 | Freeman | G06F 11/2221 702/183 |
| 2006/0146432 | A1 * | 7/2006 | Khurshudov | G11B 5/6076 360/31 |
| 2006/0146437 | A1 * | 7/2006 | Khurshudov | G11B 5/6005 360/75 |
| 2006/0259814 | A1 * | 11/2006 | Korhonen | G06F 11/1008 714/10 |
| 2008/0028264 | A1 * | 1/2008 | Kerner | G11B 27/36 714/42 |
| 2008/0104387 | A1 * | 5/2008 | Owhadi | G06F 11/2221 713/2 |
| 2009/0083580 | A1 * | 3/2009 | Postage | G06F 11/2221 714/34 |
| 2010/0115345 | A1 * | 5/2010 | Childs | G06F 11/2221 714/42 |
| 2012/0096289 | A1 * | 4/2012 | Kawakami | G06F 1/3268 713/320 |
| 2012/0284453 | A1 * | 11/2012 | Hashimoto | G06F 3/0634 711/103 |
| 2014/0019813 | A1 * | 1/2014 | McLean | G06F 11/008 714/47.3 |
| 2014/0146648 | A1 * | 5/2014 | Alber | G06F 11/0727 369/53.1 |
| 2016/0070492 | A1 * | 3/2016 | Cherubini | G06F 3/068 711/114 |
| 2016/0292025 | A1 * | 10/2016 | Gupta | G06F 11/008 |
| 2017/0131948 | A1 * | 5/2017 | Hoang | G06F 3/0653 |
| 2018/0091376 | A1 * | 3/2018 | Ramakrishna | H04L 41/142 |
| 2020/0019439 | A1 * | 1/2020 | Shibayama | G06F 9/5016 |

OTHER PUBLICATIONS

Rincon "Disk Failure Prediction in Heterogeneous Environments" Jul. 12, 2017, IEEE, pp. 1-7 (Year: 2017).*
Hughes, "Improved Disk-Drive Failure Warnings", Sep. 2002, IEEE vol. 51 No. 3 (Year: 2002).*

* cited by examiner

S.M.A.R.T. THRESHOLD OPTIMIZATION METHOD USED FOR DISK FAILURE DETECTION

FIELD

The present invention relates to disk failure detection, and more particularly to an S.M.A.R.T. (Self-Monitoring Analysis and Reporting Technology) threshold optimization method used for disk failure detection and a device using the method.

BACKGROUND ART

The combination of rapid capacity growth of storage systems for data centers and people's pursuit for high-performance yet low-cost solutions makes hardware failure that used to be accidental more and more frequent. Among all kinds of hardware failure, disk failure takes up 76%-95%, significantly higher than other hardware items. Additionally, the consequences it causes are usually of the greatest seriousness. In some extreme cases, destructive disasters such as serious data corruption and even data loss can happen. Therefore, improvement of disk reliability is more than important when it comes to an efficient and stable data storage system.

There are basically two approaches to enhancing disk reliability, namely reactive fault tolerance and proactive fault tolerance. Reactive fault tolerance involves processing identified disk failure with encoding, transcript and similar measures, so as to improve reliability. Examples of this approach include technologies such as RAID, GFS random replication technology, and chain replication technology. However, this kind of solutions can cause negative effects to reading and writing performance of disks, increase failure risk and undermine performance of the whole storage system. On the other hand, proactive fault tolerance involves failure forecast based on disk information so that a user can protectively backup data or preventively replace the disk in advance, thereby ensuring reliability of the storage system. As this approach is proven to be less responsible for hardware wear and decreased system performance, it has become a research hotspot in academic and industrial worlds for improving reliability of storage systems.

For proactive fault tolerance, the main goal is accurate forecast of disk failure. As a typical application of proactive fault tolerance, S.M.A.R.T. is extensively used by almost every leading disk manufacturers in their products. It monitors health-related information of the disk, such as disk temperature, seek error rate, reallocated sector count. When any of the monitored values exceeds its corresponding threshold set by the manufacturer, an early warning signal is given. This is an S.M.A.R.T.-based native threshold method. While such a method is easy and practicable, for minimizing its false alarm rate (FAR), it is common practice that disk makers set a high threshold, which leads to a low failure detection rate (FDR), merely 3%-10%. According to research, the use of single or simple S.M.A.R.T. attribute values is not sufficient for accurate forecast of disk failure.

Traditionally, S.M.A.R.T.-based disk failure forecast starts from feature selection and then a forecast model is built using threshold setting, statistics or machine learning, which can eventually provide forecast according to real-time data of the monitored disk. While forecast models built using machine learning do provide improved forecast performance, they have some disadvantages. The first involves low interpretability. For example, a BPNN (Back Propagation Neural Network) model is a typical black-box model, and it is difficult for a user to interpret its results or adjust its performance. Second, they involve a complex algorithm, and consequently cause considerable computation cost and memory footprint, making them only suitable for offline anomaly detection. These forecast models established through training can be too huge to be an ideal tool for online anomaly detection.

China Patent No. CN105260279A discloses a method and device of dynamically diagnosing hard disk failure based on S.M.A.R.T. data and relates to the field of data storage security diagnosis. The method comprises the following steps: 101) establishing a cloud storage server side to continuously collect three types of data; 102) establishing a hard disk failure early-warning dynamic model; 103) establishing S.M.A.R.T. parameter normal fluctuation curves and ranges; and 104) obtaining a health diagnosis scoring dynamic model through big data analysis. The method and the device of dynamically diagnosing hard disk failure based on S.M.A.R.T. data have the following beneficial effects: 1) the cloud storage server side is established to continuously collect data related to health of hard disks; 2) the collected data are organized to establish the hard disk failure early-warning dynamic model, the S.M.A.R.T parameter normal fluctuation curves and ranges and the health diagnosis scoring dynamic model, and the correctness of the model is continuously improved through machine learning in hard disk failure diagnosis. The prior patent uses offline data stored in clouds to dynamically diagnose failure through machine learning, and leave online anomaly detection and other technical issues unaddressed.

Hence, there is a need for a disk failure forecast method that accurately forecasts disk failure and provides good online anomaly detection without undermining reading and writing performance of disks.

SUMMARY

To address the shortcomings of the prior art, the present invention provides a S.M.A.R.T. threshold optimization method used for disk failure detection, wherein the method at least comprises: collecting S.M.A.R.T. attributes associated with a plurality of computer disk drives; analyzing the collected S.M.A.R.T. attributes based on correlation between S.M.A.R.T. attribute information about plural failed and non-failed disks and failure information; separating weakly correlated attributes and strongly correlated attributes; setting within a computer having a disk drive at least one of threshold intervals, multivariate thresholds and/or native thresholds corresponding to the S.M.A.R.T. attributes based on distribution patterns of the strongly correlated attributes and the weakly correlated attributes; and changing the disk drive within the computer when one or more of the settings of at least one of threshold intervals, multivariate thresholds and/or native thresholds have been met. The present invention re-divides thresholds by discriminating weakly correlated attributes from strongly correlated attributes in all S.M.A.R.T. attributes, so as to provide sensitive determination and early warning about a failed disk in a real-time manner without undermining reading and writing performance of the disk, thereby achieving online anomaly detection.

According to a preferred embodiment, the method further comprises: setting at least one of the threshold interval for a single said strongly correlated attribute based on the distribution patterns of the strongly correlated attributes of the S.M.A.R.T. attributes; and setting at least one of the multivariate thresholds for at least two said strongly correlated attributes based on the distribution patterns of the strongly correlated attributes of the S.M.A.R.T. attributes. Division of threshold intervals made differently for where there is a single strongly correlated attribute and for where there are plural strongly correlated attributes is favorable to the refining of threshold intervals, thereby monitoring the failed disk more comprehensively and detecting anomaly more sensitively.

According to a preferred embodiment, the strongly correlated attributes and the weakly correlated attributes are analyzed based on a correlation level between at least one said S.M.A.R.T. attribute and time series and/or frequency. Depending on the types of attributes, strongly correlated and weakly correlated attributes in the S.M.A.R.T. attributes are determined with reference to both time series and frequency, thereby enriching the methods for determination of S.M.A.R.T. attributes and improving accuracy, and in turn avoiding determination errors caused due to the limitations of one-dimensional determination, so as to effectively tell the strongly correlated from the weakly correlate attributes among S.M.A.R.T. attributes.

According to a preferred embodiment, the method further comprises: based on one-dimensional distribution patterns of one of the strongly correlated attribute of the non-failed and failed disks, setting at least one of the threshold interval for the strongly correlated attribute; and based on multi-dimensional distribution patterns of at least two of the strongly correlated attributes of the non-failed and failed disks, setting the multivariate thresholds for the strongly correlated attributes.

According to a preferred embodiment, the method further comprises: based on the weakly correlated attributes of the non-failed and failed disks, setting the native thresholds corresponding to the weakly correlated attributes. The present invention detects and sets a single strongly correlated attribute, plural strongly correlated attributes and native thresholds respectively, and can therefore retain those native thresholds providing early warning effectively, thereby lightening workload for re-setting threshold intervals, improving efficiency for threshold interval setting, and ensuring reliable early warning for failed disks, so as to provide effective online anomaly detection.

According to a preferred embodiment, the step of setting the at least one threshold interval for one of the strongly correlated attribute comprises: collecting the S.M.A.R.T. attribute information of the failed disks and of the non-failed disks, respectively, so as to select positive samples and negative samples associated with the strongly correlated attributes, performing learning training on the positive samples and negative samples based on at least one function so as to build a support vector machine whose false alarm rate is below a false alarm threshold, selecting at least one distribution range of the negative samples that contains relatively few positive samples as the threshold interval based on a support vector distribution diagram of the strongly correlated attributes and setting early warning.

According to a preferred embodiment, the step of setting the multivariate thresholds for at least two of the strongly correlated attributes comprises: collecting the S.M.A.R.T. attribute information of the failed disks and of the non-failed disks, respectively, so as to select positive samples and negative samples associated with at least two said strongly correlated attributes, performing learning training on the positive samples and negative samples based on at least one function so as to build a support vector machine whose false alarm rate is below a false alarm threshold; plotting a multi-dimensional support vector distribution diagram that sets at least two said strongly correlated attributes based on support vectors of the support vector machine; and selecting a distribution range of at least one said negative sample that contains relatively few positive samples based on the multi-dimensional support vector distribution diagram as the multivariate threshold interval and setting early warning. The present invention uses function training to help build support vector machines and select threshold intervals, so positive samples and negative samples can be effectively discriminated making division of effective threshold intervals effective and accurate.

According to a preferred embodiment, the strongly correlated attributes comprise data that differentiate the S.M.A.R.T. attributes of the non-failed and failed disks and data variations thereof, the data of the S.M.A.R.T. attributes comprise at least one of raw values and/or normalized values, the data variations of the S.M.A.R.T. attributes comprise at least one of a data variation rate in a certain period of time, a difference between at least two data and/or a ratio between at least two data. The present invention analyzes not only the normalized values of S.M.A.R.T. attributes but also the raw values of S.M.A.R.T. attributes to discriminate between strongly and weakly correlate attributes, thereby address the limitation caused by only considering the normalized values, so as to determine S.M.A.R.T. attributes more objectively, effectively and accurately.

According to a preferred embodiment, the method further comprises: performing simulated setting of the at least one threshold interval and/or multivariate threshold based on the forecasted raw data, thereby performing simulated early warning.

According to a preferred embodiment, the simulated setting of the at least one threshold interval and/or multivariate threshold is modulated or dynamically updated based on historically collected or real-time collected raw values.

The present invention further provides an S.M.A.R.T. threshold optimization device used for disk failure detection, wherein the device at least comprises a S.M.A.R.T. attribute analyzing unit and a threshold setting unit. The S.M.A.R.T. attribute analyzing unite receiving S.M.A.R.T. attributes associated with a plurality of computer disk drives. The S.M.A.R.T. attribute analyzing unit analyzes S.M.A.R.T. attributes based on correlation between S.M.A.R.T. attribute information about plural failed and non-failed disks and failure information and identifies weakly correlated attributes and strongly correlated attributes. The threshold setting unit sets in a computer system at least one of a threshold interval, a multivariate threshold and/or a native threshold corresponding to the S.M.A.R.T. attributes based on distribution patterns of the strongly correlated attributes and weakly correlated attributes.

According to a preferred embodiment, the threshold setting unit comprises multiple threshold interval setting unit and multivariate threshold setting unit, the multiple threshold interval setting unit setting at least one of the threshold interval for a single said strongly correlated attribute based on the distribution patterns of the strongly correlated attributes of the S.M.A.R.T. attributes; and the multivariate threshold setting unit setting the multivariate thresholds for at least two of the strongly correlated attributes based on the distribution patterns of the strongly correlated attributes of the S.M.A.R.T. attributes.

The disclosed S.M.A.R.T. threshold optimization device used for disk failure detection is a preferred application of the S.M.A.R.T. threshold optimization method used for disk failure detection. The disclosed device not only provides online anomaly detection but also gives early warning and prompt accurately in the event of failed disk and takes appropriate measures. It features fast data processing and high response sensitivity. With a promised low false alarm rate, it can greatly improve disk failure detection rate. Preferably, the disclosed device uses specific ICs for corresponding functionality. Since the forecast requires less in computation cost and memory footprint, the device can be downsized in terms of volume and footprint, making it possible to provide efficient S.M.A.R.T.-based online anomaly detection for disks with a compact device.

The present invention has the following beneficial effects:

The S.M.A.R.T. threshold optimization method used for disk failure detection of the present invention significantly improves S.M.A.R.T. failure detection rate for disks, thereby reducing the number of failures that can result in damage to processes and data, thus improving the performance of the computer system.

As compared to reactive fault tolerance, the disclosed method has no negative effects on reading and writing performance of disks and performance of storage systems as a whole, thus improving overall system performance. As compared to the known methods that use native disk S.M.A.R.T. thresholds, the disclosed method significantly improves disk failure rate detection with a low false alarm rate. As compared to disk failure forecast based on machine learning algorithm, the disclosed method has good interpretability and allows easy adjustment of its forecast performance. Besides, with less complicated algorithm, the disclosed method forecasts using relatively low computation cost and memory footprint, thus improving computer system performance by reducing or eliminating slow-down of system characteristics during detection. This also makes it desireable for online anomaly detection.

DETAILED DESCRIPTION

The following description, in conjunction with the accompanying drawings and preferred embodiments, is set forth as below to illustrate the present invention.

It is noted that, for easy understanding, like features bear similar labels in the attached figures as much as possible.

As used throughout this application, the term "may" is of permitted meaning (i.e., possibly) but not compulsory meaning (i.e., essentially). Similarly, the terms "comprising", "including" and "consisting" mean "comprising but not limited".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

As used herein, the term "automatic" and its variations refer to a process or operation that is done without physical, manual input. However, where the input is received before the process or operation is performed, the process or operation may be automatic, even if the process or operation is performed with physical or non-physical manual input. If such input affects how the process or operation is performed, the manual input is considered physical. Any manual input that enables performance of the process or operation is not considered "physical".

Embodiment 1

Figure 1:
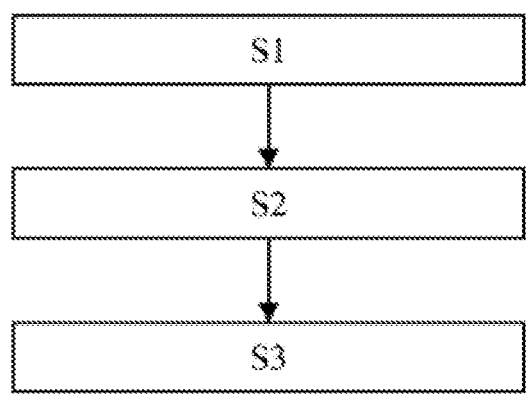
FIG. 1 is a logic diagram of an S.M.A.R.T. threshold optimization method according to one preferred embodiment of the present invention.

The present invention provides an S.M.A.R.T. threshold optimization method used for disk failure detection. As shown in FIG. 1, the method comprises the following steps:

S1: collecting S.M.A.R.T. information and failure information of a large number of disks, and marking each of the large number of disks as a non-failed disk and a failed disk according to disk failure information;

S2: analyzing and separating out weakly correlated attribute and/or strongly correlated attribute of S.M.A.R.T. attributes based on correlation between S.M.A.R.T. attribute information about plural failed and non-failed disks and failure information, and S3: setting threshold intervals, multivariate thresholds and/or native thresholds corresponding to the S.M.A.R.T. attributes based on distribution patterns of the strongly correlated attributes or weakly correlated attributes.

In the present invention, the disks used are all compatible to S.M.A.R.T technology. Disks from different manufactures and of different models have to be processed for S.M.A.R.T. threshold optimization separately. This is because disks from different disk manufactures and of different models use different S.M.A.R.T. attributes for detection. The factory-defaulted S.M.A.R.T. attributes, native thresholds and calculation for normalized values are not the same. Thus, S.M.A.R.T. threshold optimization for disks of different models shall be conducted separately.

The S.M.A.R.T. (Self-Monitoring, Analysis and Reporting Technology) information comprises the attribute values of all the S.M.A.R.T. attributes, and S.M.A.R.T. recording time. The failure information at least comprises failure emergence time, failure type, failure count and so on.

For the purpose of the present invention, a weakly correlated attribute refers to an S.M.A.R.T. attribute that remains substantially unchanged throughout the process of the S.M.A.R.T. sample collection, and an S.M.A.R.T. attribute that has similar S.M.A.R.T. attribute value distribution for a non-failed disk and for a failed disk and the discrimination between the S.M.A.R.T. attribute variations for a non-failed disk and for a failed disk is small.

A strongly correlated attribute refers to an S.M.A.R.T. attribute that has significantly different S.M.A.R.T. attribute value distribution for a non-failed disk and for a failed disk, and the discrimination between the S.M.A.R.T. attribute variations for a non-failed disk and for a failed disk is large.

Therefore, by analyzing and calculating the correlation of S.M.A.R.T. attribute information and the failure information of several failed disks and non-failed disks, S.M.A.R.T. attributes can be divided into strongly correlated attributes and weakly correlated attributes.

Preferably, the analysis of strongly correlated attributes and/or weakly correlated attributes is based on a correlation level between at least one said S.M.A.R.T. attribute and its time series and/or frequency.

Figure 2:
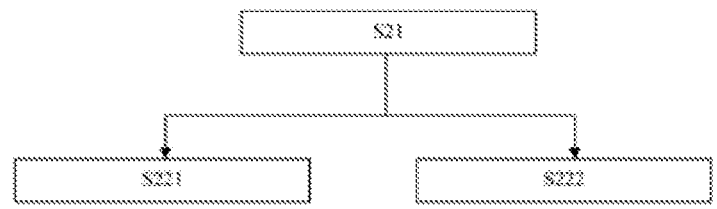
FIG. 2 is a logic diagram of an S.M.A.R.T. threshold optimization method according to another preferred embodiment of the present invention.

Particularly, as shown in FIG. 2, the step of discriminating strongly correlated attributes and weakly correlated attributes based on the time series and/or frequency comprises:

S21: based on the time series or frequency of an S.M.A.R.T. attribute, analyzing the correlation level between each S.M.A.R.T. attribute and disk failure information for a non-failed disk and a failed disk;

S221: determining that an S.M.A.R.T. attribute is a weakly correlated attribute if the S.M.A.R.T. attribute remains unchanged despite the variation of the time or frequency, or discrimination of the attribute values and the attribute value variations between a non-failed disk and a failed disk is small; and S222: determining that an S.M.A.R.T. attribute is a strongly correlated attribute if the S.M.A.R.T. attribute has its value significantly different for a non-failed disk and for a failed disk or the attribute value variations of the S.M.A.R.T. attribute is significantly different.

Preferably, the strongly correlated attributes comprise data helping to discriminate S.M.A.R.T. attributes for non-failed disks and for failed disks and data variations thereof. The data of S.M.A.R.T. attributes comprise raw values and/or normalized values. The raw values refer to raw data as collected and having not receiving any data processing. The raw values comprise historical and real-time raw values. Preferably, the raw values may comprise raw data obtained using forecast.

Preferably, the disclosed S.M.A.R.T. threshold optimization method used for disk failure detection further comprises: performing simulated setting for at least one threshold interval and/or multivariate threshold based on the forecasted raw data, thereby realizing simulated early warning, or entering in advance into preparing state for early warning, so as to realize pre-activation of an early warning device.

Preferably, the simulated setting for at least one threshold interval and/or multivariate threshold is modulated or dynamically updated based on the historically collected or real-time collected raw values. The updated analog setting for at least one threshold interval and/or multivariate threshold varies dynamically, being always ready for triggering disk failure early warning accurately. Pre-activation of early warning is important because many early warning devices and equipments need to be warmed up before being able to perform early warning. For certain early warning devices that are less frequent to perform early warning, staying standby can unnecessarily waste energy, yet entering into hibernation can hinder it from performing early warning instantly and efficiently. Therefore, simulated setting for at least one threshold interval and/or multivariate threshold helps to improve early warning efficiency of this kind of early warning devices. If it is estimated that disk failure is unlikely to happen, the early warning device is not activated. On the other hand, if it is likely that disk failure will happen, the early warning device is activated in advance, so that when disk failure actually happens, early warning can be performed at that very moment.

A normalized value is a figure obtained by processing the raw value. For example, for the raw value smart_5_raw of the attribute smart_5, its normalized value can be calculated using the raw value smart_5_raw and the equation below:

$$\text{smart\_5\_normalized} = \begin{cases} 100 - \dfrac{\text{smart\_5\_raw}}{n}, & \text{smart\_5\_raw} < 99n \\ 1, & \text{smart\_5\_raw} \geq 99n \end{cases}$$

wherein n is a constant designated by the disk manufacturer.

However, analysis considering only the correlation between normalized values and S.M.A.R.T. attributes has its limitations. The following explanation is provided with reference to an attribute smart_187.

$$\text{smart\_187\_normalized} = \begin{cases} 100 - \text{smart\_187\_raw}, & \text{smart\_187\_raw} < 99 \\ 1, & \text{smart\_187\_raw} \geq 99 \end{cases}$$

It is clear from the normalized value of the attribute smart_187 that when the raw value is greater than or equal to 99, the corresponding normalized value is always 1, showing no difference between the case where the raw value is 100 and the case where the raw value is 110.

For addressing this problem, the present invention advantageously pay attention to a raw value and a normalized value of an S.M.A.R.T. attribute both for determining whether correlation of the S.M.A.R.T. attributes is strong or weak, thereby avoiding the foregoing limitations related to normalized values, and leading to accurate determination of how an S.M.A.R.T. attribute is correlated.

The data variations of S.M.A.R.T. attributes comprise data variation rate in a certain time period, a difference between at least two data and/or a ratio between at least two data. For example, the variation rate of an S.M.A.R.T. attribute may be measured using difference of data of the S.M.A.R.T. attribute during a certain time interval.

Figure 5:
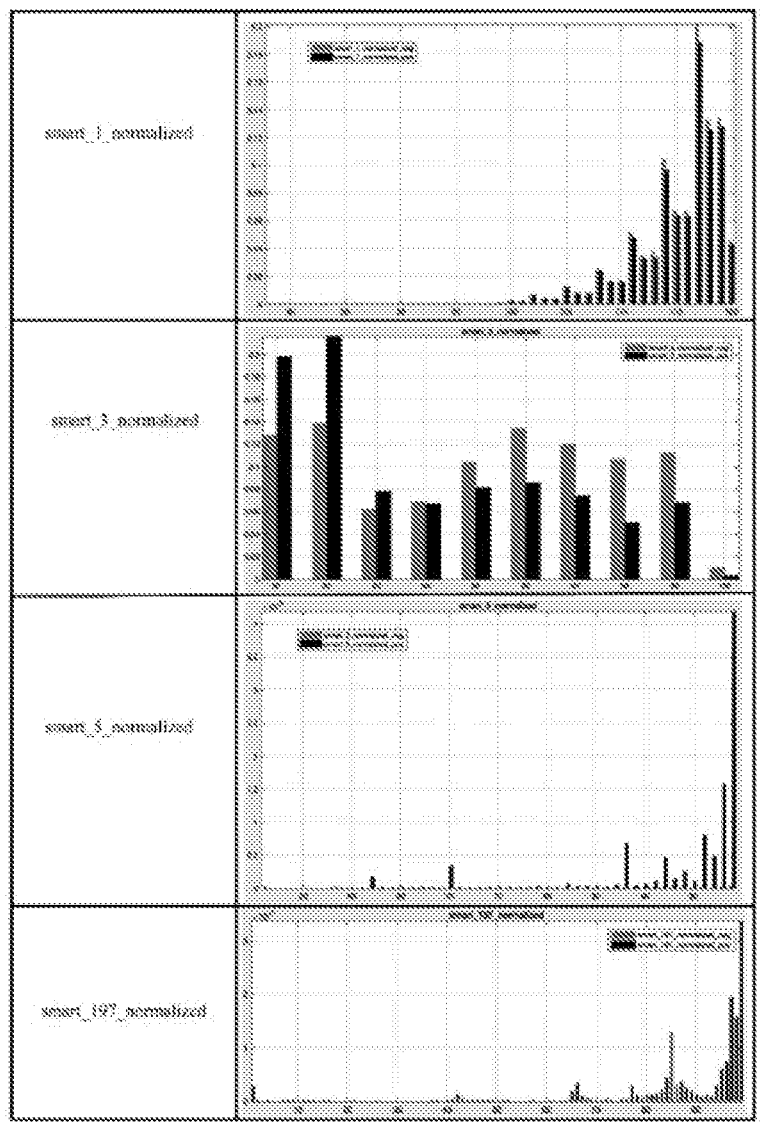
FIG. 5 are bar charts showing frequency distributions of some strongly correlated attributes and weakly correlated attributes of the present invention.

For example, the step of determining whether an S.M.A.R.T. attribute is a strongly correlated attribute and/or a weakly correlated attribute based on frequency comprises:

S231: for each failed disk, selecting $N_1$ S.M.A.R.T. samples taken $T_1=15$ days before emergence of failure as positive samples (marked as pos);

S232: for each non-failed disk, randomly selecting $N_2$ S.M.A.R.T. samples as negative samples (marked as neg), wherein $N_1=N_2$; and S233: for each S.M.A.R.T. attribute, plotting a bar chart of frequency distribution of the positive and negative samples, wherein the axis of abscissa shows the attribute value, and the axis of ordinate shows the frequency, as shown in FIG. 5. The black bars represent distribution of the frequency of the positive samples varying with the attribute value. The grey bars represent distribution of the frequency of the negative samples varying with the attribute value.

Then it can be determined whether the S.M.A.R.T. attribute is a strongly correlated attribute according to the frequency distribution of the positive and negative samples of the S.M.A.R.T. attribute as shown in the bar chart. If the positive and negative samples are not obviously different in terms of frequency distribution or the S.M.A.R.T. attribute only has one value, the S.M.A.R.T. attribute is determined as a weakly correlated attributes. If the positive and negative samples are obviously different in terms of frequency distribution, the S.M.A.R.T. attribute is determined as a strongly correlated attribute.

Preferably, in the present invention, a frequency refers to how often an S.M.A.R.T. attribute has a certain value. For example, for attribute smart_1_normalized, among the positive samples, the frequency the attribute taking the value of 115 is: the number of the positive samples for which smart_1_normalized=115/the total number of the positive samples. Among the negative samples, the frequency the attribute taking the value of 115 is: the number of the negative samples for which smart_1_normalized=115/the total number of the negative samples.

For example, the S.M.A.R.T. attribute smart_1_normalized in FIG. 5 refers to the low level data reading error rate. In the bar chart of the frequency distribution of the S.M.A.R.T. attribute smart_1_normalized, the positive and negative samples are similar in terms of frequency distribution variation, having no obvious difference therebetween. Thus, the S.M.A.R.T. attribute smart_1_normalized is determined as a weakly correlated attribute.

Another S.M.A.R.T. attribute, smart_3_raw, (not shown) represents the spin-up time of the spindle, and the positive and negative samples only take an exclusive value, namely 0. Therefore, the positive and negative samples are identical in terms of frequency distribution variation, having no obvious difference. Thus, the S.M.A.R.T. attribute smart_3_raw is determined as a weakly correlated attribute.

Still another S.M.A.R.T. attribute, smart_10_normalized, (not shown) represents the number of spindle spin-up retries, and the positive and negative samples only take an exclusive value, namely 100. Therefore, the positive and negative samples are identical in terms of frequency distribution variation, having no obvious difference. Thus, the S.M.A.R.T. attribute smart_10_normalized is determined as a weakly correlated attribute.

In FIG. 5, in the bar chart showing frequency distribution of the S.M.A.R.T. attribute smart_3_normalized, the black frequency distribution of the positive samples and the grey frequency distribution of the negative samples are obviously different. In the range of attribute values of 0~93, the frequency distribution of the positive samples is obviously greater than that of the negative samples. In the range of attribute values of 94~100, the frequency distribution of the positive samples is obviously smaller than that of the negative samples. Therefore, the positive and negative samples are obviously different in terms of frequency distribution. Thus, the S.M.A.R.T. attribute smart_3_normalized is determined as a strongly correlated attribute.

In FIG. 5, in the bar chart showing frequency distribution of the S.M.A.R.T. attribute smart_5_normalized, the black frequency distribution of the positive samples and the grey frequency distribution of the negative samples are obviously different. In the range of attribute values of 0~99, the frequency distribution of the positive samples is obviously greater than that of the negative samples, and the frequency distribution of the negative sample is close to 0. Therefore, the positive and negative samples are obviously different in terms of frequency distribution. Thus the S.M.A.R.T. attribute smart_5_normalized is determined as a strongly correlated attribute.

In FIG. 5, the S.M.A.R.T. attribute smart_197_normalized represents the number of sectors to be mapped. In the bar chart showing frequency distribution of the S.M.A.R.T. attribute smart_197_normalized, the black frequency distribution of the positive samples and the grey frequency distribution of the negative samples are obviously different. In the range of attribute values of 0~99, the frequency distribution of the positive samples is obviously greater than 0, and increases as the attribute value increases. On the other hand, the frequency distribution of the negative sample is close to 0, and is barely visible in the chart. Therefore, the positive and negative samples are obviously different in terms of frequency distribution, and the S.M.A.R.T. attribute smart_197_normalized is determined as a strongly correlated attribute.

Preferably, the step of determining whether the S.M.A.R.T. attribute is a strongly correlated attribute and/or a weakly correlated attribute based on time series comprises the following steps.

In S241, for each S.M.A.R.T. attribute, the disks whose S.M.A.R.T. attributes have changed during the sample collecting time are sieved out from all of the failed and non-failed disks.

For some S.M.A.R.T. attributes, such as smart_5_normalized, the failed disks having attribute value variations only take up 7.2% of all the failed disks, and the non-failed disks having attribute value variations only take up 0.04% of all the non-failed disks. For most disks, this S.M.A.R.T. attribute remains consistent. Thus, the disks having S.M.A.R.T. attribute variations have to be sieved out and a plot has to be made for examining whether variation of an S.M.A.R.T. attribute acts differently depending on whether a disk has failed or not.

Figure 6:
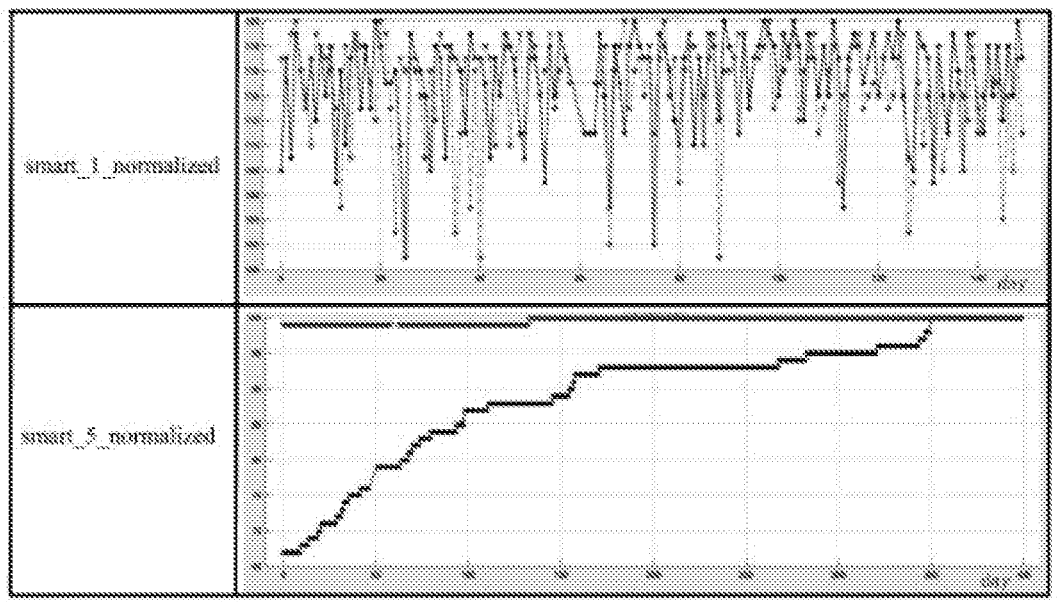
FIG. 6 provides time plots of one strongly correlated attribute and one weakly correlated attribute of the present invention.

In S242, a time plot of the S.M.A.R.T. attributes is made according to the S.M.A.R.T. attribute information of the sieved disks. As shown in FIG. 6, the axis of abscissa shows the sample collecting time (for failed disks, the axis of abscissa shows the number of days before failure happened; for non-failed disk, the axis of abscissa shows the number of days to the last collecting time), and the axis of ordinate shows the attribute value of the S.M.A.R.T. attribute.

In S243, according to the time plot of the S.M.A.R.T. attributes of the non-failed and failed disks, whether the variation of the S.M.A.R.T. attribute is a strongly correlated attribute is determined. If in $T_2=30$ days before failure emergence, the variation of the S.M.A.R.T. attribute of a failed disk and the variation of the S.M.A.R.T. attribute of a non-failed disk show no obvious difference, the variation of the S.M.A.R.T. attribute is determined as a weakly correlated attribute. For example, the attribute smart_1_normalized in FIG. 6 represents the low level data reading error rate. In the time plot of the S.M.A.R.T. attribute, the grey dotted curve defined by triangles describes the S.M.A.R.T. attribute for non-failed disks, i.e. the negative samples. The S.M.A.R.T. attribute of the negative sample has its peak irregularly varying over time. The black solid curve defined by circles describes the S.M.A.R.T. attribute of failed disks, i.e. the positive samples. The S.M.A.R.T. attribute of the positive samples similarly has its peak irregularly varying over time. In other words, there are no distinguished difference between the variations of the attribute smart_1_normalized of the positive and negative samples over time. Thus, the variation of the S.M.A.R.T. attribute smart_1_normalized is determined as a weakly correlated attribute.

If the variation of the S.M.A.R.T. attribute of the failed disks in $T_2$=30 days before failure emergence is obviously different from that of the non-failed disks, the variation of the S.M.A.R.T. attribute is determined as a strongly correlated attribute. For example, the attribute smart_5_normalized in FIG. 6 represents the count of reallocated sectors. The grey dots shows the S.M.A.R.T. attributes of non-failed disks, i.e. the negative samples. The attribute value distribution is around 100 and does not vary over time. The black dots represent the S.M.A.R.T. attributes of failed disks, i.e. the positive samples. The attribute value significantly varies over time. In other words, the variations of the attribute smart_5_normalized of the positive and negative samples show obvious difference over time, so the variation of the attribute smart_5_normalized is determined as a strongly correlated attribute.

Preferably, the sample collecting time is not limited to 30 days, and it may alternatively be any duration at arbitrary timing and in any different unit of time. The duration may be counted in any of years, months, days, hours, minutes, seconds, milliseconds, microseconds, and nanoseconds.

Figure 3:
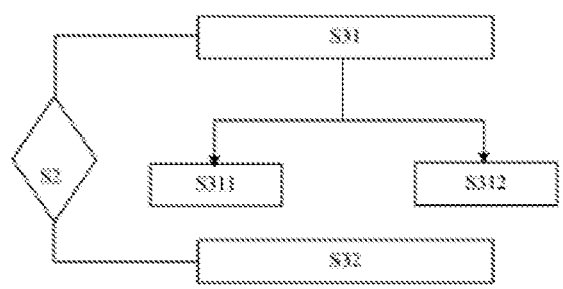
FIG. 3 is a logic diagram of an S.M.A.R.T. threshold optimization method according to still another preferred embodiment of the present invention.
Figure 4:
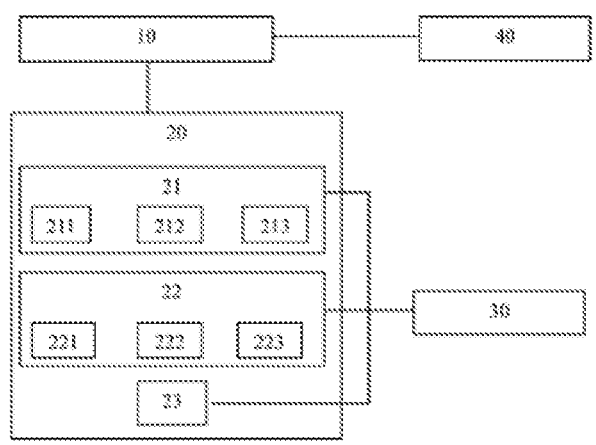
FIG. 4 is a logic structural diagram of an S.M.A.R.T. threshold optimization device used for disk failure detection of the present invention.

Preferably, as shown in FIG. 3, the step of setting threshold intervals, multivariate thresholds and/or native thresholds for the corresponding S.M.A.R.T. attribute based on the strongly or weakly correlated attributes comprises the following steps.

In S31, the distribution patterns of strongly correlated attributes of non-failed and failed disks are compared and analyzed, and the strongly correlated attributes are optimized in two aspects. That is, optimization is made to the threshold with one single strongly correlated attribute and the threshold having at least two strongly correlated attributes.

In S32, a native threshold corresponding to the weakly correlated attributes is set based on the weakly correlated attribute of the non-failed and failed disks.

Preferably, the step of performing threshold optimization on the strongly correlated attributes comprises:
S311: setting at least one threshold interval for the single strongly correlated attribute based on the distribution pattern of the strongly correlated attribute of the S.M.A.R.T. attributes; and
S312: setting multivariate thresholds for at least two strongly correlated attributes based on the distribution patterns of the strongly correlated attributes of the S.M.A.R.T. attributes.

Preferably, there is a strongly correlated attribute present between some non-failed and failed disks, and at least one threshold interval is set for the single said strongly correlated attribute, that is the setting of multiple threshold intervals. Preferably, the at least one threshold interval comprises at least one separate interval within the value range of the strongly correlated attribute. If at any moment the data of the strongly correlated attribute is beyond the set threshold interval, the device triggers disk alarm or takes other reaction.

Preferably, the at least one threshold interval of the strongly correlated attribute is set based on the one-dimensional distribution pattern of the single strongly correlated attribute of non-failed and failed disks.

Preferably, the step of setting said at least one threshold interval for a single said strongly correlated attribute comprises:
collecting the S.M.A.R.T. attribute information of the failed disks and of the non-failed disks, respectively, so as to select positive samples and negative samples associated with the strongly correlated attribute;
performing learning training on the positive samples and negative samples based on at least one function, so as to build a support vector machine whose false alarm rate is below a false alarm threshold; and
selecting at least one negative sample distribution range that contains relatively few positive samples as the threshold interval based on the support vector distribution diagram of the strongly correlated attribute and setting early warning.

Preferably, the step of setting at least one threshold interval for a single strongly correlated attribute comprises the following detailed steps.

In S41, if the strongly correlated attribute is the attribute value of the S.M.A.R.T. attribute, for each failed disk, S.M.A.R.T. samples in $T_3$=7 days before failure emergence are selected as positive samples.

If the strongly correlated attribute is variation of the S.M.A.R.T. attribute, for each failed disk, the difference of the attribute value of the S.M.A.R.T. attribute in $T_4$=1 day as variation of the S.M.A.R.T. attribute, and S.M.A.R.T. samples for which the variation of the S.M.A.R.T. attribute is not 0 in $T_5$=30 days before failure emergence are selected as positive samples.

In S42, if the strongly correlated attribute is the attribute value of the S.M.A.R.T. attributes, for each non-failed disk, $n_2$=4 S.M.A.R.T. samples are randomly selected as negative samples. If the strongly correlated attribute is variation of the S.M.A.R.T. attribute, for each non-failed disk, the difference of the attribute values of the S.M.A.R.T. attribute in $T_4$=1 day first is calculated as the variation of the S.M.A.R.T. attribute, and $n_2$=4 S.M.A.R.T. samples are randomly selected from the samples collected in the last $T_5$=30 days as positive samples.

In S43, the positive samples and negative samples for the strongly correlated attribute are taken as the input for the support vector machine. The kernel function is selected as a Gaussian kernel function or a linear kernel function. The parameters are adjusted. Training is performed using 5-fold cross validation, whereby a support vector machine for the strongly correlated attribute having a false positive rate up to 1% and having the best possible true positive rate is obtained.

Preferably, the false positive rate=the number of samples falsely alarmed as positive samples (failed disk samples) but are actually negative samples (non-failed disk samples)/the actual number of negative samples, that is, in other words, the proportion of the non-failed disks that have wrong alarm in all the non-failed disk samples. The true positive rate=the number of samples correctly forecasted as positive samples and actually are positive samples/the number of the actual positive samples, or the proportion of correctly detected failed-disk samples.

In the present invention, the term "support vector machine" (or SVM) refers to a classifier using support vectors for computation. Therein, the word "machine" means machinery, and can be seen as a classifier. In the process of computation, it is found that the classifier can be determined using merely some data, and these data are referred to as support vectors.

Figure 7:
FIG. 7 illustrates setting of at least one threshold interval for a single strongly correlated attribute.

In S44, the support vector distribution diagram of the strongly correlated attribute is plotted according to support vectors of the support vector machine obtained through training, wherein the abscissa represents the value of the strongly correlated attribute. The support vector distribution diagram is plotted based on the threshold interval of a single strongly correlated attribute, and is one-dimensional, as shown in FIG. 7. In other words, the support vector distribution diagram only has abscissa, and has no ordinate. The ordinate is meaningless. Therein, the round dots represent support vectors of non-failed disks (negative samples), and the cross points represent the support vectors of failed disks (positive sample).

In S45, multiple threshold intervals are set according to the support vector distribution diagram of the strongly correlated attribute. On the premise that negative samples are not set beyond the threshold intervals, placing as few as possible positive samples inside the threshold intervals, this ensures obtaining multiple threshold intervals that significantly improve failure detection rate with low false alarm rate, namely threshold intervals $A_1$, $A_2$ and $A_3$.

In S46, for the strongly correlated attribute, if the attribute of an unknown sample has its value falling within the multiple threshold intervals, the sample is forecasted as a negative sample. On the contrary, if the value of the unknown sample is beyond the multiple threshold intervals, the sample is forecasted as a positive sample.

As shown in FIG. 7, the abscissa represents disk S.M.A.R.T. characteristic smart_7_normalized, i.e. the value of the seek error rate, and the ordinate has no meaning. The round dots represent support vectors corresponding to good disks (negative samples), and the cross dots represent support vectors corresponding to failed disks (positive samples). For the attribute Seek Error Rate, the native threshold algorithm sets the threshold at the point $A_1$ as shown in the drawing in order to keep the false alarm rate low. The range greater than the threshold $A_1$ is forecasted as good, and what is smaller than or equal to the threshold $A_1$ is forecasted as failed. As can be seen in FIG. 7, many of the positive samples much greater than the threshold $A_1$ are not detected. For addressing this, multiple threshold intervals may be set, as the plural threshold interval $A_1$, $A_2$ and $A_3$ shown in FIG. 7, so that any characteristic having a value in any of the frames if forecasted as good, otherwise forecasted as failed. In this way, the failure detection rate can be improved.

Preferably, some non-failed disks and failed disks have multiple strongly correlated attributes, or at least two strongly correlated attributes, and a multivariate threshold is set for the plural strongly correlated attributes. Preferably, the multivariate threshold comprises multi-dimensional tuples collected based on at least two strongly correlated attributes.

Preferably, the step of setting the multivariate thresholds for at least two said strongly correlated attributes comprises:
collecting the S.M.A.R.T. attribute information of the failed disk and of the non-failed disk, respectively, so as to select positive samples and negative samples associated with at least two strongly correlated attributes;
performing learning training on the positive samples and negative samples based on at least one function so as to build a support vector machine whose false alarm rate is below a false alarm threshold;
plotting a multi-dimensional support vector distribution diagram of at least two strongly correlated attributes based on support vectors of the support vector machine; and
selecting at least one negative sample distribution range that contains relatively few positive samples as the multivariate threshold interval based on the multi-dimensional support vector distribution diagram and setting early warning.

Preferably, the step of setting the multivariate thresholds for at least two strongly correlated attributes comprises the flowing detailed steps:

In S51, if there are plural strongly correlated attributes having the attribute value of the S.M.A.R.T. attribute, for each failed disk, the S.M.A.R.T. samples in $T_3$=7 days before failure emergence are selected as positive samples. If one of the plural strongly correlated attributes is variation of the S.M.A.R.T. attribute, for each failed disk, the S.M.A.R.T. samples that are in $T_5$=30 days before failure emergence are selected and none of the variation of the S.M.A.R.T. attributes is 0 are selected as positive samples.

In S52, if there are plural strongly correlated attributes having the attribute value of the S.M.A.R.T. attribute, for each failed disk, $n_3$=4 S.M.A.R.T. samples are randomly selected as positive samples. If one of the plural strongly correlated attributes is variation of the S.M.A.R.T. attribute, for each non-failed disk, $n_2$=4 S.M.A.R.T. samples collected in the last $T_5$=30 days collect are randomly selected as positive samples.

In S53, the positive samples and negative samples for the plural strongly correlated attributes are taken as the input of the support vector machine. A kernel function is selected as a Gaussian kernel function or a linear kernel function. The parameters are adjusted. Training is performed using 5-fold cross validation, so as to obtain a support vector machine for which the false positive rate (false alarm rate) for the plural strongly correlated attributes is below 1% and the true positive rate (failure detection rate) is as high as possible.

In S54, a multi-dimensional support vector distribution diagram of the plural strongly correlated attribute is plotted using the support vectors of the support vector machine obtained through training, wherein each coordinate of one dimension represents a value of a strongly correlated attribute, respectively. The round dots represent support vectors of non-failed disks (negative samples), and the cross dots represent support vectors of failed disks (positive samples).

In S55, the multivariate threshold is set according to the multi-dimensional support vector distribution diagram. On the premise that negative samples are not put outside multivariate threshold intervals, as few as possible positive samples are placed within the multivariate threshold intervals, so as to obtain the multivariate threshold intervals that significantly improve the failure detection rate with low false alarm rate.

In S56, for plural strongly correlated attributes, if the value of an unknown sample is within the multivariate threshold intervals, the sample is forecasted as a negative sample; otherwise, forecasting it as a positive sample.

Figure 8:
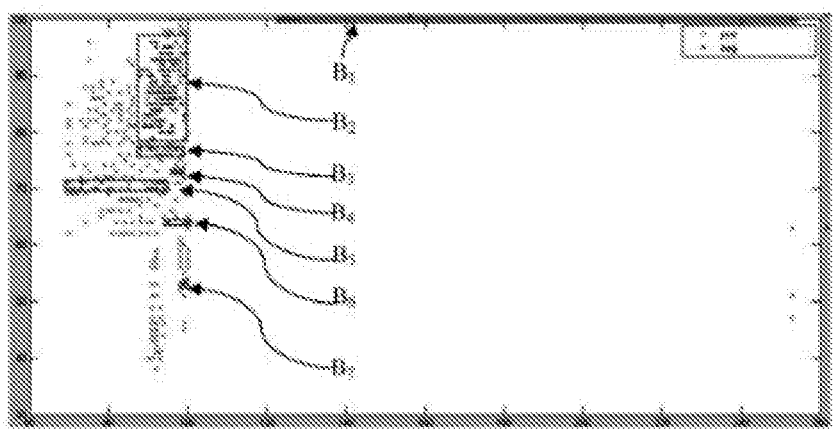
FIG. 8 illustrates setting of multivariate threshold intervals for at least two strongly correlated attributes.
Figure 9:
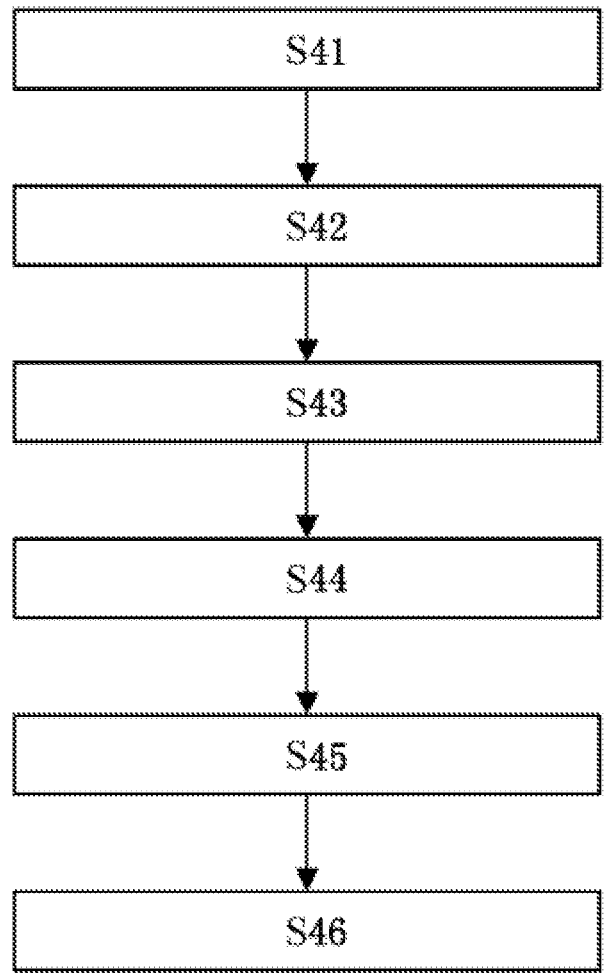
FIG. 9 is a logic diagram of an S.M.A.R.T. threshold optimization method according to still another preferred embodiment of the present invention.
Figure 10:
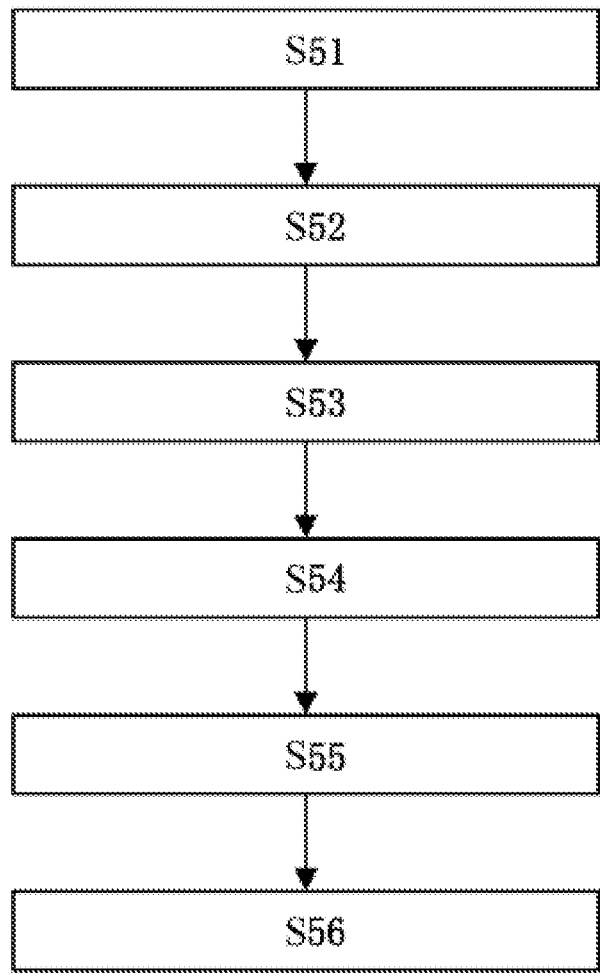
FIG. 10 is a logic diagram of an S.M.A.R.T. threshold optimization method according to still another preferred embodiment of the present invention.

Setting of the multivariate threshold is similar to setting of the multiple threshold intervals. As shown in FIG. 8, the abscissa represents the disk S.M.A.R.T. characteristic smart_3_normalized, namely the value of the spin-up time of the spindle, and the ordinate represents the disk S.M.A.R.T. characteristic smart_9_normalized, namely the value of accumulated power-on time. The round dots represent support vectors corresponding to good disks (negative samples), and the cross dots represent support vectors corresponding to failed disks (positive samples). On the premise that the negative samples are not placed outside the frames, it is tried to place as few as possible positive samples in the frames, so as to form multivariate threshold intervals $B_1$, $B_2$, $B_3$, $B_4$, $B_5$, $B_6$ and $B_7$. In this way, it is ensured that the failure detection rate can be improved more effectively with low false alarm rate. If an unknown sample has its value falling within the multivariate threshold intervals of $B_1$ to $B_7$, it is forecasted that the sample is a negative sample. Otherwise, the sample is forecasted as a positive sample, and early warning is given.

Embodiment 2

The present embodiment is based on further improvement to Embodiment 1, and no repeated description is provided herein.

The present embodiment provides an S.M.A.R.T. threshold optimization device used for disk failure detection. It at least comprises an S.M.A.R.T. attribute analyzing unit 10 and a threshold setting unit 20. The S.M.A.R.T. attribute analyzing unit 10 comprises one or some of an application-specific integrated chip, a CPU, a microprocessor, a controller, a memory and a server for analyzing and processing data. The threshold setting unit 20 comprises one or some of an application-specific integrated chip, a CPU, a microprocessor, a controller, a memory and a server for making plots and processing data.

The S.M.A.R.T. attribute analyzing unit 10 analyzes and sieves out weakly correlated attributes and/or strongly correlated attributes of S.M.A.R.T. attributes based on the S.M.A.R.T. attribute information about plural failed and non-failed disks and correlation of failure information. The threshold setting unit 20 sets threshold intervals, multivariate thresholds and/or native thresholds corresponding to the S.M.A.R.T. attributes based on distribution patterns of strongly correlated attributes or weakly correlated attributes.

Preferably, the threshold setting unit 20 comprises a multiple threshold interval setting unit 21 and a multivariate threshold setting unit 22.

The multiple threshold interval setting unit 21 comprises one or some of an application-specific integrated chip, a CPU, a microprocessor, a controller, a memory and a server for setting at least one threshold interval for a single strongly correlated attribute, and for data processing and calculation.

The multivariate threshold setting unit 22 comprises one or some of an application-specific integrated chip, a CPU, a microprocessor, a controller, a memory and a server for setting multivariate thresholds for at least two strongly correlated attributes, and for data processing and calculation.

The multiple threshold interval setting unit 21 setting at least one threshold interval for a single strongly correlated attribute based on the distribution patterns of the strongly correlated attributes of the S.M.A.R.T. attributes. Alternatively, the multivariate threshold setting unit 22 setting multivariate thresholds for at least two strongly correlated attributes based on the distribution patterns of the strongly correlated attributes of the S.M.A.R.T. attributes.

Preferably, the S.M.A.R.T. attribute analyzing unit 10 analyzes strongly correlated attributes and/or weakly correlated attributes based on the correlation level of at least one S.M.A.R.T. attribute and the time series and/or frequency.

Preferably, the multiple threshold interval setting unit 21 sets at least one threshold interval for strongly correlated attributes based on the one-dimensional distribution pattern of the single strongly correlated attribute of non-failed and failed disks.

The multivariate threshold setting unit 22 sets the multivariate thresholds for strongly correlated attributes based on the multi-dimensional distribution pattern of at least two strongly correlated attributes of non-failed and failed disks.

Preferably, threshold setting unit 20 further comprises a native threshold setting unit 23. The native threshold setting unit 23 comprises one or some of an application-specific integrated chip, a CPU, a microprocessor, a controller, a memory and a server for setting native thresholds corresponding to weakly correlated attributes.

The native threshold setting unit sets native thresholds corresponding to weakly correlated attributes based on weakly correlated attributes of non-failed and failed disks.

Preferably, the multiple threshold interval setting unit 21 further comprises a first sampling unit 211, a first building unit 212 and a first threshold interval dividing unit 213.

The first sampling unit 211 collects the S.M.A.R.T. attribute information of the failed disk and of the non-failed disk, respectively, so as to select positive samples and negative samples associated with strongly correlated attributes, The first building unit 212 performs learning training on positive samples and negative samples based on at least one function so as to build a support vector machine whose false alarm rate is below a false alarm threshold, The first threshold interval dividing unit 213 selects at least one negative sample distribution range that contains least positive samples as a threshold interval based on the support vector distribution diagram of strongly correlated attributes and setting early warning.

Preferably, the multivariate threshold setting unit 22 further comprises a second sampling unit 221, a second building unit 222, and a second threshold interval dividing unit 223.

The second sampling unit 221 collects the S.M.A.R.T. attribute information of the failed disk and of the non-failed disk, respectively, so as to select positive samples and negative samples associated with at least two strongly correlated attributes.

The second building unit 222 performs learning training on positive samples and negative samples based on at least one function so as to build a support vector machine whose false alarm rate is below a false alarm threshold.

The second threshold interval dividing unit 223 plots a multi-dimensional support vector distribution diagram of at least two strongly correlated attributes based on support vectors of the support vector machine; selecting at least one negative sample distribution range that contains least positive samples as the multivariate threshold interval based on the multi-dimensional support vector distribution diagram and setting early warning.

Preferably, the strongly correlated attributes comprise data of S.M.A.R.T. attributes that can discriminate non-failed and failed disks and data variations thereof.

The data of S.M.A.R.T. attributes comprise raw values and/or normalized values.

The data variations of S.M.A.R.T. attributes comprise a data variation rate in a certain time period, a difference between at least two data and/or a ratio between at least two data.

Preferably, the multiple threshold interval setting unit 21, the multivariate threshold setting unit 22 and the native threshold setting unit 23 are connected to the early warning unit 30 in a wired or wireless manner, respectively. When the multiple threshold interval setting unit, the multivariate threshold setting unit and/or the native threshold setting unit give an instruction of early warning, the early warning unit 30 gives early warning in a corresponding early-warning manner. The early-warning manner includes but is not limited to stopping the disk, ejecting the disk, stopping corresponding functionality, stopping data reading, giving audible and visual warning signals and so on. Preferably, the early warning unit comprises one or some of an application-specific integrated chip, a CPU, a microprocessor, a controller, a memory and a server for actively giving early warning or doing reactive early warning according to instructions it receives.

Preferably, the S.M.A.R.T. attribute analyzing unit 10 may be used to introduce data or connected to a data introducing device 40 that stores data, so as to sample and analyze disk data. Preferably, the data introducing device 40 comprises data memories, data transmission interface, data-storing servers, cloud servers or third-party database servers, and one or some of an application-specific integrated chip, a CPU, a microprocessor, sensors for various purposes for collecting and/or processing data. The sensors for various purposes may be, for example, video cameras, acoustic sensors, light sensors, temperature sensors, gas sensors, electricity sensors, pressure sensors and so on.

Preferably, the disclosed S.M.A.R.T. threshold optimization device used for disk failure detection further comprises a threshold analog setting module. The threshold analog setting module comprises one or some of an application-specific integrated chip, a CPU, a microprocessor, a controller, a memory and a server for forecasting raw values and processing normalized values.

The threshold analog setting module performs simulated setting for at least one threshold interval and/or multivariate threshold based on the forecasted raw data, so as to form simulated intervals for threshold optimization. When a disk is operating, if an S.M.A.R.T. attribute value of the disk falls within the threshold-optimization analog intervals, it means that failure related to this S.M.A.R.T. attribute is highly probable. The analog setting module provides the early warning device 30 with a pre-activation instruction, making the early warning device 30 proactively get ready for early warning, so as to realize pre-activation of an early warning device. On the contrary, the analog setting module gives no pre-activation instruction to the early warning device 30.

Preferably, the threshold analog setting module modulates or dynamically updates the simulated setting for at least one threshold interval and/or multivariate threshold based on the historically collected or real-time collected raw values. The analog setting of the updated threshold interval and/or multivariate threshold vary dynamically, and can activate early warning for disk failure accurately anytime. Pre-activation of early warning is important because many early warning devices and equipments need to be warmed up before being able to give early warning. Particularly, for early warning devices that are less frequent to give early warning, staying standby can unnecessarily waste energy, yet entering into hibernation can hinder it from giving early warning instantly and efficiently. Therefore, the presence of the threshold analog setting module helps to improve early warning efficiency of this kind of early warning devices. If it is estimated that disk failure is unlikely to happen, the early warning device is not activated. On the other hand, if it is likely that disk failure will happen, the early warning device is activated in advance, so that when disk failure actually happens, early warning can be given at that very moment.

The disclosed S.M.A.R.T. threshold optimization device used for disk failure detection is suitable for executing the steps of the S.M.A.R.T. threshold optimization method used for disk failure detection as stated previously, so as to achieve the expected technical effects. The disclosed S.M.A.R.T. threshold optimization device used for disk failure detection is a product for implementing the S.M.A.R.T. threshold optimization method used for disk failure detection. The disclosed device uses specific ICs for corresponding functionality. Since the forecast requires less in computation cost and memory footprint, the device can be downsized in terms of volume and footprint, making it possible to provide efficient S.M.A.R.T.-based online anomaly detection for disks with a compact device.

The disclosed device brings no negative effect on reading and writing performance of disks, and works without undermining the performance of the resulting storage system as a whole. The disclosed device significantly improves disk failure detection rate while keeping the false alarm rate relatively low. The method adopted by the disclosed device has strong interpretability between its steps, and can timely adjust its forecast performance. Besides, since the algorithm it uses is less complicated, good efficiency of disk failure detection can be achieved, while minimizing or eliminating the effect on the computer system.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A self-monitoring analysis and reporting technology (S.M.A.R.T.) threshold optimization method used for disk failure detection, comprising the steps of:
    collecting S.M.A.R.T. attributes associated with a plurality of computer disk drives;
    analyzing the collected S.M.A.R.T. attributes based on correlation between S.M.A.R.T. attribute information about plural failed and non-failed disks and failure information;
    separating weakly correlated attributes and strongly correlated attributes;
    setting within a computer having a disk drive at least one of threshold intervals, multivariate thresholds and/or native thresholds corresponding to the S.M.A.R.T. attributes based on distribution patterns of the strongly correlated attributes and weakly correlated attributes;
    changing the disk drive within the computer when one or more of the settings of at least one of threshold intervals, multivariate thresholds and/or native thresholds have been met;
    setting at least one of the threshold intervals for one of the strongly correlated attributes based on the distribution patterns of the strongly correlated attributes of the S.M.A.R.T. attributes; and
    setting at least one of the multivariate thresholds for at least two of the strongly correlated attributes based on the distribution patterns of the strongly correlated attributes of the S.M.A.R.T. attributes.

2. The S.M.A.R.T. threshold optimization method of claim 1, wherein the strongly correlated attributes and the weakly correlated attributes are analyzed based on a correlation level between at least one said S.M.A.R.T. attribute and time series and/or frequency.

3. The S.M.A.R.T. threshold optimization method of claim 2, wherein the method further comprises the steps of:

based on one-dimensional distribution patterns of one of the strongly correlated attributes of the non-failed and failed disks, setting at least one of the threshold intervals for the strongly correlated attribute; and based on multi-dimensional distribution patterns of at least two of the strongly correlated attributes of the non-failed and failed disks, setting the multivariate thresholds for the strongly correlated attributes.

4. The S.M.A.R.T. threshold optimization method of claim 3, wherein the method further comprises:

based on the weakly correlated attributes of the non-failed and failed disks, setting the native thresholds corresponding to the weakly correlated attributes.

5. The S.M.A.R.T. threshold optimization method of claim 4, wherein the step of setting the at least one threshold interval for one of the strongly correlated attributes comprises:

collecting the S.M.A.R.T. attribute information of the failed disks and of the non-failed disks, respectively, so as to select positive samples and negative samples associated with the strongly correlated attributes;

performing learning training on the positive samples and negative samples based on at least one function so as to build a support vector machine whose false alarm rate is below a false alarm threshold; and selecting at least one distribution range of the negative samples that contains relatively few positive samples as the threshold interval based on a support vector distribution diagram of the strongly correlated attributes and setting early warning.

6. The S.M.A.R.T. threshold optimization method of claim 4, wherein the step of setting the multivariate thresholds for at least two of the strongly correlated attributes comprises:

collecting the S.M.A.R.T. attribute information of the failed disks and of the non-failed disks, respectively, so as to select positive samples and negative samples associated with at least two said strongly correlated attributes;

performing learning training on the positive samples and negative samples based on at least one function so as to build a support vector machine whose false alarm rate is below a false alarm threshold;

plotting a multi-dimensional support vector distribution diagram that sets at least two said strongly correlated attributes based on support vectors of the support vector machine; and selecting a distribution range of at least one said negative sample that contains relatively few positive samples based on the multi-dimensional support vector distribution diagram as the multivariate threshold interval and setting early warning.

7. The S.M.A.R.T. threshold optimization method of claim 6, wherein the strongly correlated attributes comprise data that differentiate the S.M.A.R.T. attributes of the non-failed and failed disks and data variations thereof, in which the data of the S.M.A.R.T. attributes comprise at least one of raw values and/or normalized values, and the data variations of the S.M.A.R.T. attributes comprise at least one of a data variation rate in a certain period of time, a difference between at least two data and/or a ratio between at least two data.

* * * * *